(12) United States Patent
Jacob et al.

(10) Patent No.: US 6,169,609 B1
(45) Date of Patent: Jan. 2, 2001

(54) IMAGING DEVICE AND METHOD FOR IMPLEMENTING A COLOR MAP WITH K-ONLY BLACK POINT WHILE REDUCING INTERPOLATOR ARTIFACTS

(75) Inventors: Steve A. Jacob; David A. Johnson; Jeffrey L. Trask, all of Boise, ID (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/095,001

(22) Filed: Jun. 9, 1998

(51) Int. Cl.⁷ ...................................................... G03F 3/08
(52) U.S. Cl. ........................... 358/1.9; 358/518; 358/523; 358/529; 358/534
(58) Field of Search ........................... 358/1.9, 501, 515, 358/518, 523, 529, 455, 456, 534; 382/162, 167, 275

(56) References Cited

U.S. PATENT DOCUMENTS

| | | | |
|---|---|---|---|
| 4,551,751 | * | 11/1985 | Jung ...................................... 358/518 |
| 4,893,177 | * | 1/1990 | Tada et al. ............................. 358/515 |
| 4,908,712 | * | 3/1990 | Uchiyama et al. ................... 358/298 |
| 5,008,742 | * | 4/1991 | Shigaki et al. ........................ 358/529 |
| 5,719,956 | * | 2/1998 | Ogatsu et al. ........................ 358/518 |
| 5,774,238 | * | 6/1998 | Tsukada ................................ 358/529 |
| 5,784,172 | * | 7/1998 | Coleman ............................... 358/298 |
| 5,887,124 | * | 3/1999 | Iwasaki et al. ........................ 358/1.9 |
| 5,937,087 | * | 8/1999 | Sasanuma et al. .................... 358/518 |
| 6,031,630 | * | 2/2000 | Blair et al. ............................. 358/1.9 |

* cited by examiner

Primary Examiner—Thomas D. Lee
(74) Attorney, Agent, or Firm—Lane R. Simmons

(57) ABSTRACT

A color mapping scheme is provided which enables a K-only black point while minimizing interpolator image artifacts. Specifically, a system and method of reducing image artifacts for a color imaging device include implementing a color map so that no C, M or Y color value that is used in defining the black point is produced, except at the black point. The system and method further include implementing a halftone ramp so that: (i) a halftone pattern is selected to provide no rendering for any C, M or Y color value that is used in defining the black point, and (ii) a halftone pattern is selected to provide a full rendering for any K color value that is used in defining the black point. The color map is also implemented so that no C, M or Y color value that is used in defining the black point is obtained as a result of interpolation, except for at the black point.

21 Claims, 5 Drawing Sheets

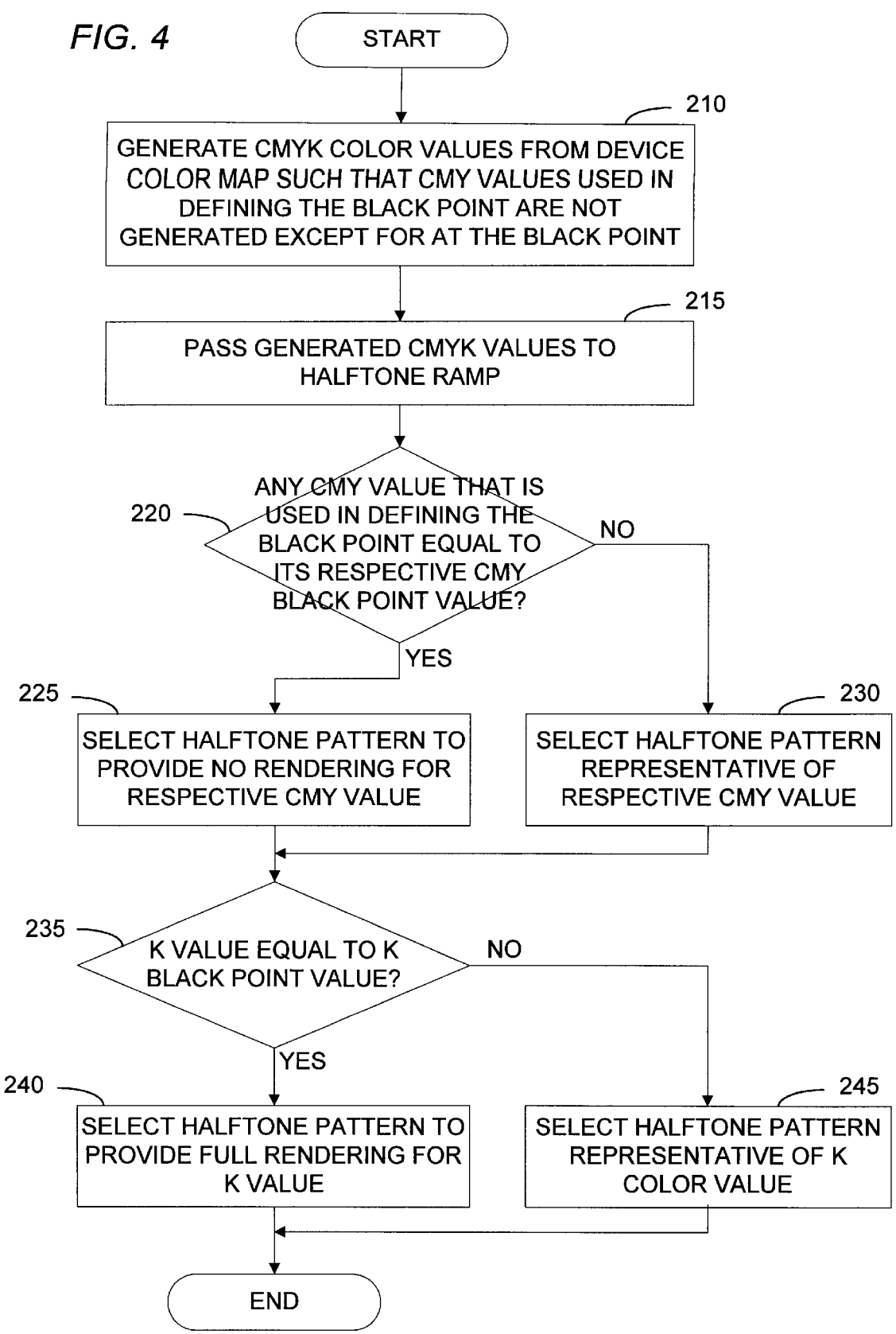

IMAGING DEVICE AND METHOD FOR IMPLEMENTING A COLOR MAP WITH K-ONLY BLACK POINT WHILE REDUCING INTERPOLATOR ARTIFACTS

FIELD OF THE INVENTION

This invention relates in general to color imaging and, more particularly, to systems and methods for constructing color interpolation tables used in color image reproduction systems, such as printers, photocopiers, scanners, and the like.

BACKGROUND OF THE INVENTION

Laser driven color printers and copiers employ transparent toners which enable light to reflect off the page and to be directed back towards the eye. In general, such devices employ Cyan (C), Magenta (M) and Yellow (Y) toners as the principal component colors, from which other colors are created. Light passing through CMY toners has part of its color filtered out or absorbed by the toner such that the reflected light takes on the color of the toners that it passes through. In laser printers (and some copiers), a black (K) toner is used which is opaque to light. If a K toner is overprinted onto CMY to achieve darker colors, such as found in shadows, much of the colorfulness of the darker colors is lost because less surrounding colorant is used. Thus, to increase the range of colors available from a printer/copier, it is necessary to find a correct balance of K and CMY toners to produce dark colors, while allowing the dark colors to remain as colorful as possible.

While the prior art has employed combinations of the three primary colors cyan, magenta and yellow (CMY) to produce darker colors ranging to black, the need to deposit 100% density toner layers for each color causes an excessive amount of toner to be deposited on the media sheet (e.g. up to 300%). Such a high level of toner deposition does not fuse well and, in general, creates unsatisfactory images. Accordingly, conventional printing procedures have utilized combinations of K and CMY toners to achieve dark or shadowed color images.

When a printer receives image data from a host processor, the data is typically received in the form of either Red, Green, Blue (RGB) or CMY values. In either case, the received values are converted to CMYK values in order to achieve desired levels of color representation on the final printed document. Such conversion, depending upon the color value parameters that are set by the printer manufacturer, can result in variable color representations when printers of different manufacturers are coupled to a host processor.

Accordingly, a device color map or maps (also referred to as a table or tables) is conventionally used to convert the RGB or CMY values to CMYK values. In other words, the color map produces color separation information. The color map holds entries that specify relative quantities (or blends) of CMYK color values, resulting in various color shades, indexed by (or accessed from) the three primary input colors (e.g., RGB or CMY) received. The color map can be conceptualized as a three-dimensional color space defined by the three primary colors. The map entries define equal spaced color points in this space along the three color axes. As an example, a color map might have seventeen (17) color points along each of the three color axes. Movement along each axis results in a different color output.

The initial (input) RGB or CMY values received are typically three 8-bit values that identify one color point on each color axis. However, only four bits of each eight bit value typically identify one of the first sixteen (16) of the seventeen (17) color points along its respective axis. The other four bits of each eight bit value are then used to interpolate to a further point along each axis (relative to the point identified with the first four bits) to obtain a more accurate and truer resultant blended color quantity output. All in all, the image reproduction system uses the initial RGB or CMY color value received to lookup in the color map(s) and retrieve the appropriate CMYK color blending quantities to form the desired color. The parameters retrieved from the color map(s) are passed to the imaging subsystem to produce a colored dot. As an example, in an interleaved color map the entries (or outputs) include four 8-bit values, one for each of the three CMY colors and a fourth value for K-black. Alternatively, in a planar color map (where a separate color map is used for each individual CMY or K color value), a respective 8-bit value is output from each individual CMYK color map.

In essence, device color space can be represented mathematically by a three dimensional to four dimensional color table. The 3D input (RGB) is used as input coordinates to lookup or interpolate to the 4D output (CMYK). In the context of the present invention, the RGB input values are monitor (or display apparatus) color space values, and the CMYK entry (or output) values are printer toner values (hereafter, the term, toner, will be used to encompass both ink and toner). The four dimensional output (i.e., CMYK) represents possible combinations of the three input colors (i.e., RGB or CMY). In a device color space, each axis or basis vector represents an amount of input (RGB or CMY), starting at the origin with zero as its value and moving outward until a maximum value is reached, i.e., either 1.0 or 255, depending upon the current usage. Each axis represents a primary input color and combinations of toner amounts (or values) are represented as entries in the device color space.

Theoretically, equal amounts of input color values should produce output colors that are perceived by an observer to be neutral (gray) in color or to have no colorfulness. However, in reality, although equal RGB values in monitor color space are neutral, equal amounts of output color values (for toner deposit) in printer color space are virtually never neutral. The loci of points that have coordinates of equal values of component colors is defined to be the neutral axis of the device color space. Perceptually, the neutral axis of the device color space is expected to go from one extreme of lightness to the other (i.e., white to black or vice versa) without any perceivable colorfulness.

"Process black" is where equal amounts of CMY toners are used to obtain a black color. Theoretically, if the darkest most colorful black is required, and the printer uses CMY to create the black color, then 300% toner will need to be deposited on the paper (i.e., 100% density quantities of each of the three CMY primary colors). However, under such circumstance toner usage is excessive and it can run off the page or may not fuse properly to the page. Further, since CMY toners are transparent, the blackest black may not be obtainable using only CMY toners.

When K toner is used to create black, little, if any, CMY needs to be used, resulting in a savings in toner. However, a K-only black doesn't have as smooth of appearance as a black produced using some combined amounts of CMY and K. Determining the amount of K toner to use and how much CMY not to use when creating black, is termed "color separation". Further, determining how much K toner to use to replace equal amounts of CMY toner is called "gray component replacement" or GCR. For any CMY color, the portion of the component colors that equal the value of the minimum color component (i.e., of C, M or Y) is called the neutral or "gray component". The gray component is also defined as the "undercolor" and, again, is the minimum amount of C, M and Y found in any CMY color. The percentage of undercolor that is removed when K toner is used (instead of the CMY undercolor gray component) is called undercolor removal (UCR) and is usually a number from 0–1 or a percentage from 0 to 100%.

Now, when building color maps, it is desirable to have process black on the neutral axis to maximize image quality. On the other hand, it is desirable to have K-only on the neutral axis to minimize line art and text artifacts (i.e., registration errors, halftone jaggies, etc. that tend to occur with process black). However, combining both process black and K-only in a single color map is a problem.

One conventional compromise is to retain process black on the neutral axis while designating K-only at the black point in the color map. This allows images to enjoy the process black, and yet allows black text to have clean edges. However, this also causes steep gradients in the color map (table) that the interpolator quantizes, which can result in undesirable interpolator or image artifacts. Additionally, the jump from full process black to no process black at the K-only black point can cause a process black ramp of $\frac{1}{16}$ of the color range (when using four bits of an 8 bit color value). This is undesirable for images because the black toner doesn't adequately hide the ramp effect.

To illustrate, if for example the CMYK color component values range from 0–255 (zero being no color and 255 being full color), then the truest definition for a full process black would be CMY=255,255,255. However, some variation in these CMY values in combination with a K value enables a workable process black as known in the art (when undercolor removal and color separation issues are considered and since maximum toner limits dictate a 250% or less black point). For example, one implementation of a satisfactory process black is known to be C=255, M=0, Y=0, K=255. However, this shows that there is still at least one color plane value (cyan) that must be ramped down to zero to attain a true K-only black point. But, to ramp (or interpolate) that color plane's component value down to zero to reach the K-only black point is a significant jump that often results in undesirable image artifacts.

Accordingly, an object of the present invention is to minimize image artifacts when using a color mapping scheme having a K-only black point.

SUMMARY OF THE INVENTION

According to principles of the present invention in a preferred embodiment, a color mapping scheme is provided which enables a K-only black point while minimizing interpolator image artifacts. Specifically, a system and method of reducing image artifacts for a color imaging device include implementing a color map so that no C, M or Y color value that is used in defining the black point is produced, except at the black point; and further include implementing a halftone ramp so that: (i) a halftone pattern is selected to provide no rendering for any C, M or Y color value that is used in defining the black point, and (ii) a halftone pattern is selected to provide a full rendering for any K color value that is used in defining the black point.

For example, all values (entries) in the color map are limited to 254 of 255 except at the black point (where a 0 value is no color and a 255 value is full color). Then, the halftone ramps are defined so that at the 255 value point, the C, M and Y halftones produced are 0 (zero) and the K halftone is 255 (where a zero is selective of a halftone pattern that deposits no toner, and a 255 is selective of a halftone pattern that deposits full toner).

According to further principles, the color map is also implemented so that no C, M or Y color value that is used in defining the black point is obtained as a result of interpolation, except for at the black point.

Other objectives, advantages, and capabilities of the present invention will become more apparent as the description proceeds.

DESCRIPTION OF THE DRAWINGS

FIG. 4 is a flow chart depicting a preferred method of the present invention.

DETAILED DESCRIPTION OF THE INVENTION

Figure 1:
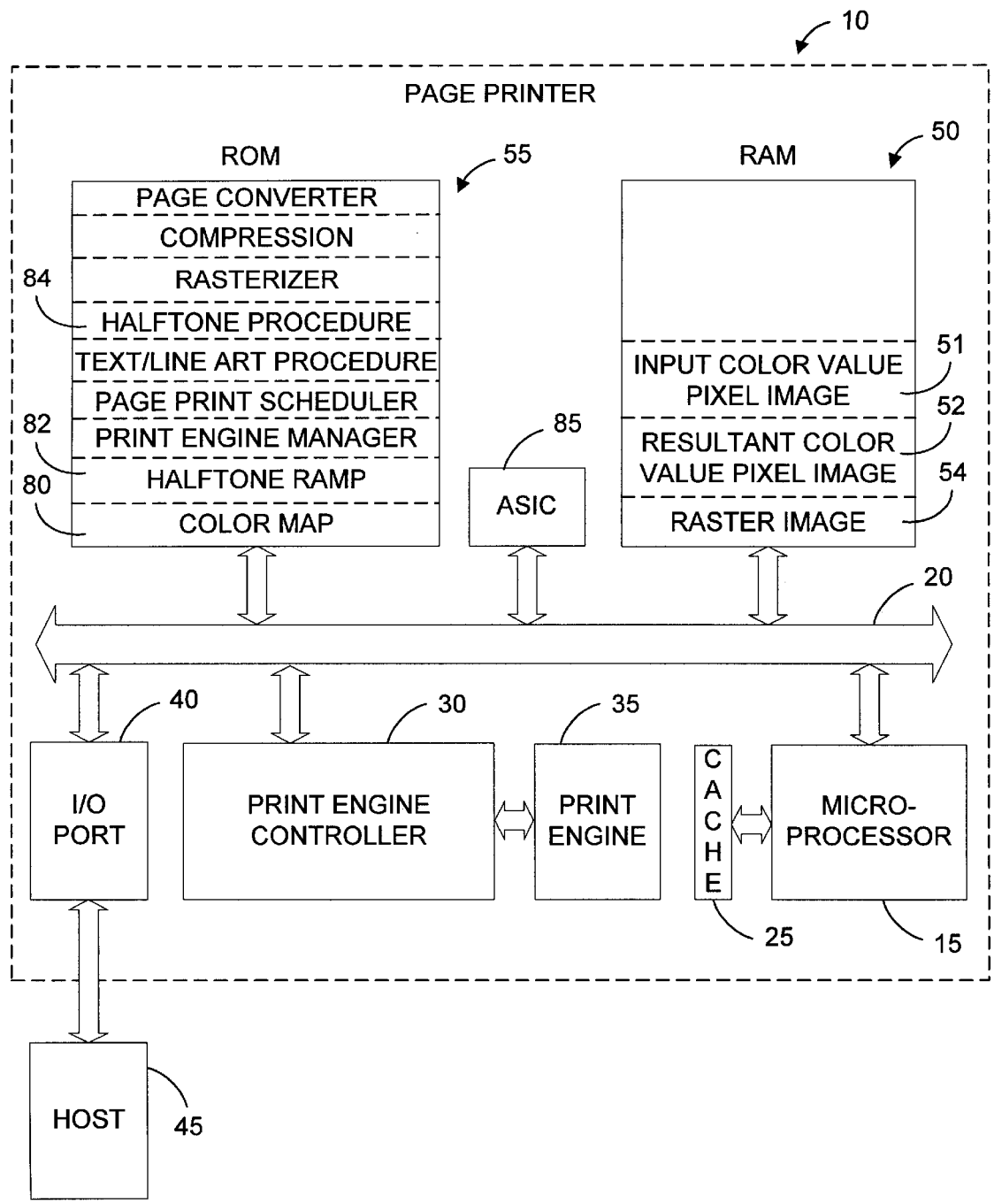
FIG. 1 is a block diagram of a page printer incorporating the present invention color mapping scheme and halftone ramp for enabling a K-only black point for reducing image artifacts.

FIG. 1 is a high level block diagram of a color page printer 10 incorporating the present invention apparatus and method, including color mapping scheme and halftone ramp, for enabling a K-only black point for reducing image artifacts. Page printer 10 is controlled by a microprocessor 15 which communicates with other elements of the system via bus 20. Microprocessor 15 includes cache memory 25 in a preferred embodiment. A print engine controller 30 and associated print engine 35 connect to bus 20 and provide the print output capability for the page printer. For purposes of this disclosure, print engine 35 is a laser printer that employs an electrophotographic drum imaging system as well known in the art. However, as will be obvious to those of ordinary skill in the art, the present invention is similarly applicable to other types of printers and/or imaging devices including, for example, ink jet printers, facsimile devices, digital copiers, or the like.

An input/output (I/O) port 40 provides communications between the page printer 10 and a host computer 45 and receives page descriptions (or raster data) from the host for processing within the page printer. A dynamic random access memory (RAM) 50 provides a main memory for the page printer for storing and processing a print job data stream received from host 45. A read only memory (ROM) 55 holds firmware which controls the operation of microprocessor 15 and page printer 10. It is understood, however, that procedures discussed herein for printer 10 may be maintained and utilized as control firmware in any conventional ROM, and/or implemented in an ASIC 85 for high-speed hardware functionality, and/or implemented in connection with RAM 50 or cache 25 for storage and buffering purposes as conventional in the art.

Code procedures stored in ROM 55 include, for example, a page converter, rasterizer, compression code, halftone procedure 84, text/line art procedure, page print scheduler, print engine manager, and/or other image processing procedures (not shown) for generating an image from a print job data stream. As conventional in the art, the page converter firmware converts a page description received from the host to a display command list, with each display command defining an object to be printed on the page. The rasterizer firmware converts each display command to an appropriate bit map (rasterized strip or band) and distributes the bit map into memory 50. The compression firmware compresses the rasterized strips in the event insufficient memory exists in memory 50 for holding the rasterized strips. The object of halftone procedure 84 is to convert any continuous tone image into a halftoned raster image. The text/line art procedure also converts any text and line art images into a raster image. These may be conventional procedures known in the art.

Importantly, ROM 55 further includes device color map (or color table) 80 and halftone ramp 82 according to principles of the present invention. Namely, color map (or maps) 80 and halftone ramp (or ramps) 82 include routines, tables and/or other data structures as necessary for reducing image artifacts as will be discussed more fully herein. Although in FIG. 1 color map 80 and halftone ramp 82 are depicted in connection with ROM 55, it will be obvious and understood by those of ordinary skill in the art that the same may be implemented in ASIC 85 instead.

RAM 50 is shown as storing resultant color value pixel image 52. Resultant color value pixel image 52 is generated from color map 80 and input color value pixel image 51. Specifically, image data 51 received from host 45, either in RGB or CMY format for example, is converted to CMYK format by color map 80. Thus, color value pixel image 52 comprises four color planes with three of the color planes representing cyan (C), magenta (M) and yellow (Y) color values, and the fourth color plane representing a black (K) color value. Each color value in each plane may be represented by a predetermined number of bits—for example, by 8 bits, at each pixel location where an image is to appear on the ultimate rendered output. Thus there are a total of 32 bits per pixel in color value pixel image 52. However, other bit depths and color planes, such as in hi-fi printing, are equally applicable in the present invention, as will be obvious to those of ordinary skill in the art.

Color value pixel image 52 is altered into source raster image 54 for rendering by laser print engine 35. Namely, color value pixel image 52 is passed through halftone procedure 84, as dictated by halftone ramp 82 of the present invention, to become raster image 54. Raster image 54 may be buffered in RAM 50 as shown or fed directly from ASIC 85 to print engine 35.

Figure 2:
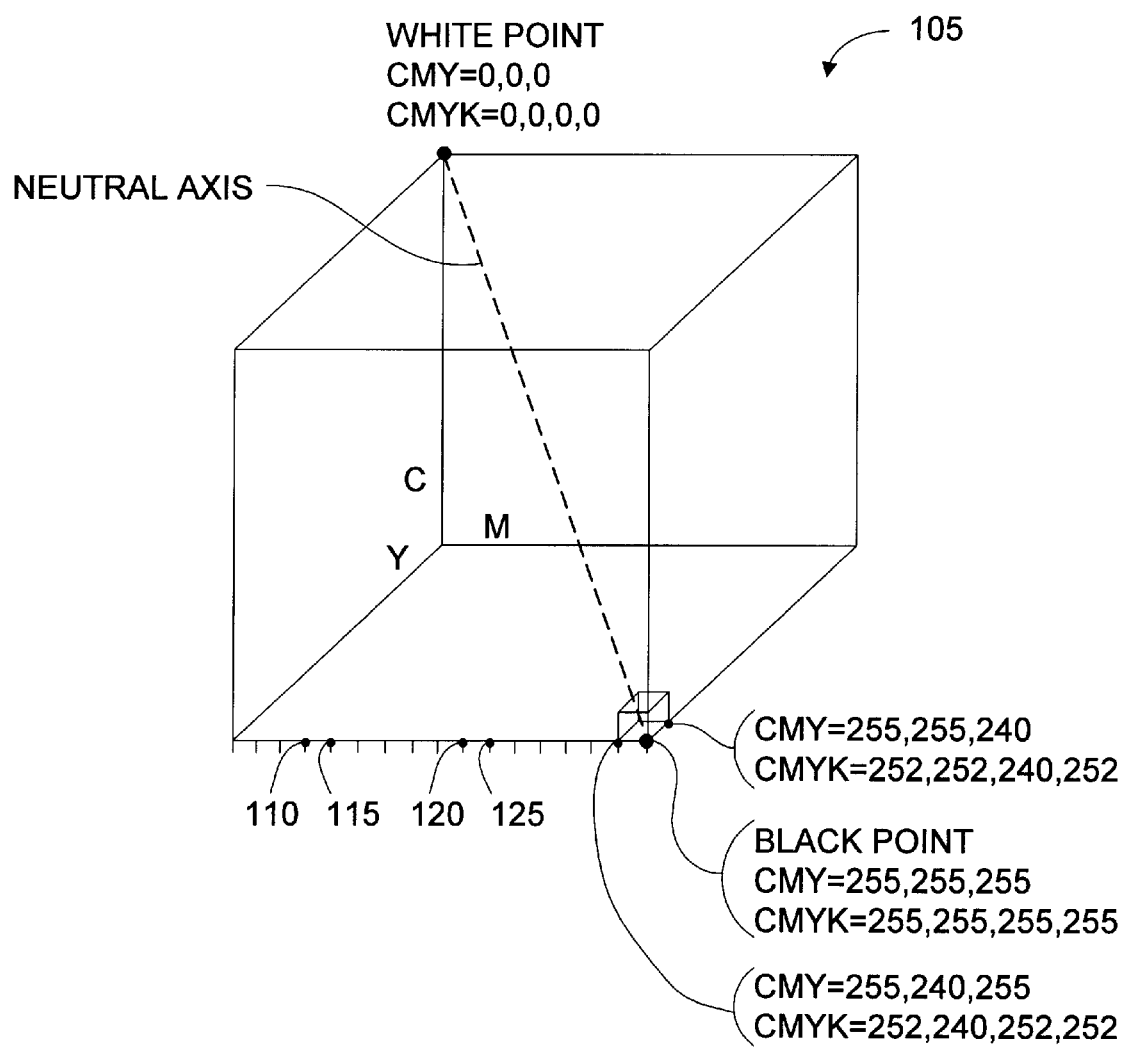
FIG. 2 is a three-dimensional representation of an interleaved device color map (table) according to the present invention for producing color separation information with limited color values except for at the black point.

FIG. 2 is a three-dimensional representation of an interleaved device color map (table) 105 according to the present invention for producing color separation information. Namely, map 105 represents a logical device for converting from CMY color values (or some other color values, such as RGB) to CMYK color values for printer 10. In a preferred embodiment, map 105 is implemented as a routine or table 80 in ROM 55 of FIG. 1. Color map 105 is represented with the CMY input values defined as index points on the y, x and z axes respectively. There are seventeen (17) index points defined on each axis. The first sixteen (16) points are addressable by four lower order bits of an eight bit input pixel color value associated with input color value pixel image 51 (FIG. 1). The contents associated with each index point includes the respective C, M, Y and K color output blending values (or quantities) designated to form the desired resultant color on printer 10 (relative to the original input CMY values). In other words, four eight-bit color values, one for each CMYK color plane, are the resultant outputs from map 105 as derived from a specific CMY input value. For example, the CMY input index for the "white point" (i.e., no color value) is CMY=0,0,0, and its respective contents or resultant CMYK output value is CMYK=0,0,0,0. Similarly, the CMY input index for the "black point" (i.e., full black value) is CMY=255,255,255, and its respective contents or resultant CMYK output value is CMYK=255, 255,255,255. Although the black point value as shown is represented as 255 for each plane, being indicative of a process black, it is important to note that under the present invention this process black point value is subsequently converted to a K-only black point at the halftone ramp as will be discussed more fully herein.

Although map 105 represents a single interleaved color map for generating resultant CMYK color values, it will be obvious that multiple planar maps may also be used. Namely, a separate map may be implemented for each respective C, M, Y or K color plane, each having a three dimensional (i.e., RGB or CMY) input, whereby the resultant output of each map is the respective singular C, M, Y or K blending value.

In this example, since the original CMY input data is defined by eight bits, the range of input values is from 0–255 for a total of 256 values for each color plane. As mentioned, the first 16 index points for each CMY color plane in map 105 are addressable by the lower order four bits, and 16 further sub-values (for example, between each pair of exemplary index points 110, 115 or 120, 125, etc.) are attainable via interpolation methods by reference to the higher order four bits of the original CMY input data. A conventional interpolator as well known in the art is associated with ASIC 85 (FIG. 1) for interpolating the higher order four bits and producing the appropriate CMYK values. All in all, for each CMY value identified or interpolated, an eight bit output pixel is generated for each CMYK color plane, with each eight bit pixel having a color value range of 0–255. For simplification and ease of discussion purposes, FIG. 2 is drawn to show only a few exemplary index points.

Importantly, the present invention implements color map 105 such that all resultant CMYK values are limited to some number less than the 255 maximum (for eight bits in this example), except at the black point. For example, in reference to index point CMY=255,255,240, the resultant CMYK value under the present invention in a preferred embodiment is CMYK=252,252,240,252; whereas conventionally it would typically be CMYK=255,255,240,255. Similarly, in reference to index point CMY=255,240,255, the resultant CMYK value is preferably CMYK=252,240, 252,252; whereas conventionally it would typically be CMYK=255,240,255,255. As a third example, in reference to index point CMY=240,255,255, the resultant CMYK value is preferably CMYK=240,252,252,252; whereas conventionally it would typically be CMYK=240,255,255,255. Thus, in each of these examples, where any CMYK value might conventionally be at its black point value of 255, under the present invention that CMYK value is limited to less than the black point value, i.e., 252.

On the other hand, at the actual black point where the CMY index value is CMY=255,255,255, the CMYK value under the present invention is CMYK=255,255,255,255. Namely, the CMYK values are allowed to be the black point value because we are at the black point itself. Thus, the limiting of the resultant CMYK values in map 105 to some value less than the defined maximum (black point value) everywhere except for at the black point enables the present invention to send specific, unique data to the halftone ramp for subsequent halftone screen selection. As will be discussed, it is at the halftone ramp that this color mapping scheme enables a K-only black point.

In a preferred embodiment, the maximum CMYK values are limited to 252 (in an eight bit per pixel context) for improved immunity relative to JPEG lossy compression issues. However, other values are similarly usable. For example, 254 may equally be implemented as the redefined "maximum" color value (in an eight bit per pixel context) if so chosen.

In addition to limiting the CMYK entry (output) of each CMY index point to less than the defined maximum color value (i.e., something other than the black point value), each CMYK color value that is produced as a result of an interpolation of a CMY value is also limited to some value other than the defined black point value except for at the black point itself. This occurs by filtering any normally interpolated CMYK value such that if it equals the black point value, and not all CMYK values are at the black point, then a non-black point value is substituted therefore prior to halftone screen selection at the halftone ramp. Alternatively, the interpolator is configured to not produce the black point CMYK color value except for at the black point (i.e., except for when all CMY input values are at the black point).

It should be noted that although the discussion so far has been focused on the assumption that the black point value is a maximum value in a given color range (i.e., 255 in an eight bit per pixel context), the invention is equally applicable where the black point is defined as some other non-maximum value in the given color range. For example, in the event the input black point is defined to be CMY=255,255, 255, and the output black point is defined to be CMYK= 255,255,120,255, then the same principles apply in that no C, M, Y or K value produced (either as a result of a direct index point match or as an interpolated value generated) can have a respective C, M, Y or K black point value except at the black point.

It should also be noted that regardless of whether the black point is defined as a maximum or non-maximum value of a given range, the present invention is similarly applicable in the context of limiting only the C, M, and Y color values to some value other than the black point value, except for at the black point, but not necessarily limiting the K color value. As will be seen, this is feasible because of the halftone ramp implementation to be discussed. Moreover, under the present invention, only the C, M or Y values that define the black point need be limited to some value other than the black point (except for at the black point). For example, if a given printer has a defined black point of CMYK=255,0, 0,255, then under the present invention only the C color plane need have its color values limited to some value less than 255. Alternatively, the C and K color planes might have their color values limited. But the M and Y color planes needn't have their color values limited. In this context (CMYK=255,0,0,255), it is understood herein that of the primary colors CMY, only the C color plane is considered to be used in defining the black point because it is described with a non-zero color value (where zero=white and non-zero=color), and because the MY color planes are described with zero color values. Similarly, the non-primary color K is used in defining the black point because it is also described with a non-zero color value.

Now, in view of color map 105 limiting the CMYK output color values to something other than the defined black point value except for at the black point, the next step is to select the proper respective halftone screen (or halftone screen value) for toner development (rendering) purposes. Specifically, in reference now to FIGS. 3A and 3B, halftone ramps 150 and 155 are depicted in graph form to show, respectively, a halftone screen value selection relative to CMY and K color values as received from color map 105 of FIG. 2 (i.e., respective CMYK color values output from color map 105 are now input values to halftone ramps 150 and 155). Each halftone ramp 150 and 155 is implemented as a routine or table 82 in ROM 55 of FIG. 1. FIG. 3C depicts an alternate embodiment halftone ramp 160. Although each halftone ramp 150, 155 and 160 of FIGS. 3A–C are shown as being linear for simplicity of depiction and discussion, it should be noted that the ramps are typically non-linear.

Importantly, the halftone ramp(s) of the present invention enable a K-only black point in connection with the controlled color values received from color map 105. In a preferred embodiment, and in reference to FIG. 3A, the halftone ramps of the present invention are implemented so that at the 252 C, M or Y color value received from color map 105, a full 255 halftone value is selected, and at the 255 C, M or Y color value received, a zero (white) halftone value is selected. In contrast, and in reference to FIG. 3B, at the 255 K color value received, a full 255 halftone value is selected. Thus, a K-only black point is enabled. Alternatively, FIG. 3C depicts a full 255 halftone value selected at the 252–255 K color value received from color map 105.

Figure 3A:
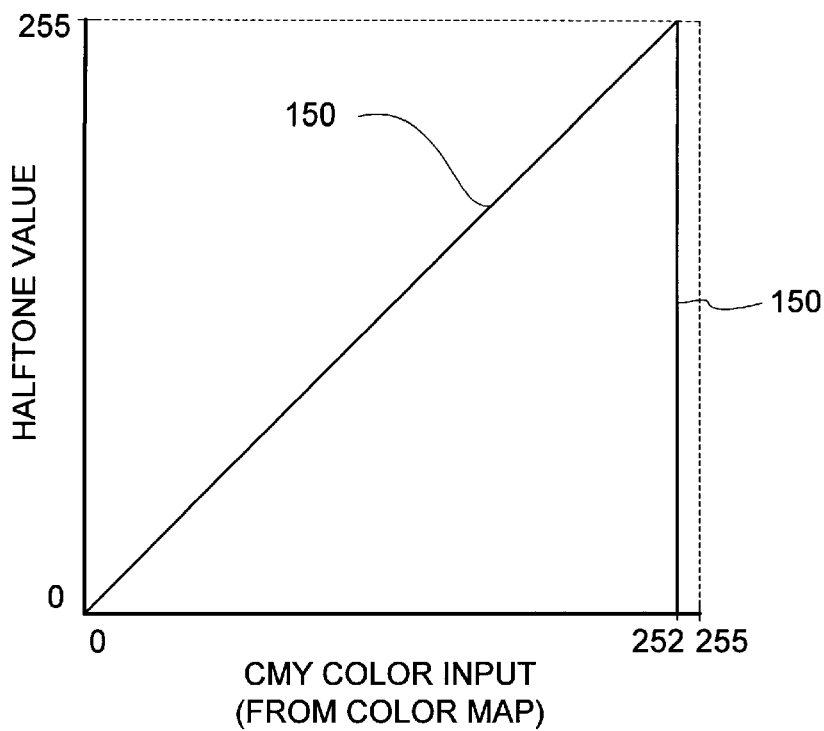
FIGS. 3A–C are halftone ramps depicted in graph form to show halftone screen selection relative to CMYK values output from the color map of FIG. 2.

Although FIG. 3A represents a halftone screen value selection relative to all three primary color values CMY, this is only exemplary. Specifically, if, as previously discussed, a black point is defined as CMYK=255,0,0,255, then under the present invention only the C color plane need employ the halftone ramp of FIG. 3A, and the MY color planes may utilize a conventional halftone ramp (i.e., wherein a zero input value results in a zero halftone selection and a 255 input value results in a 255 halftone selection, similar to the ramp represented by FIG. 3B).

Figure 3B:
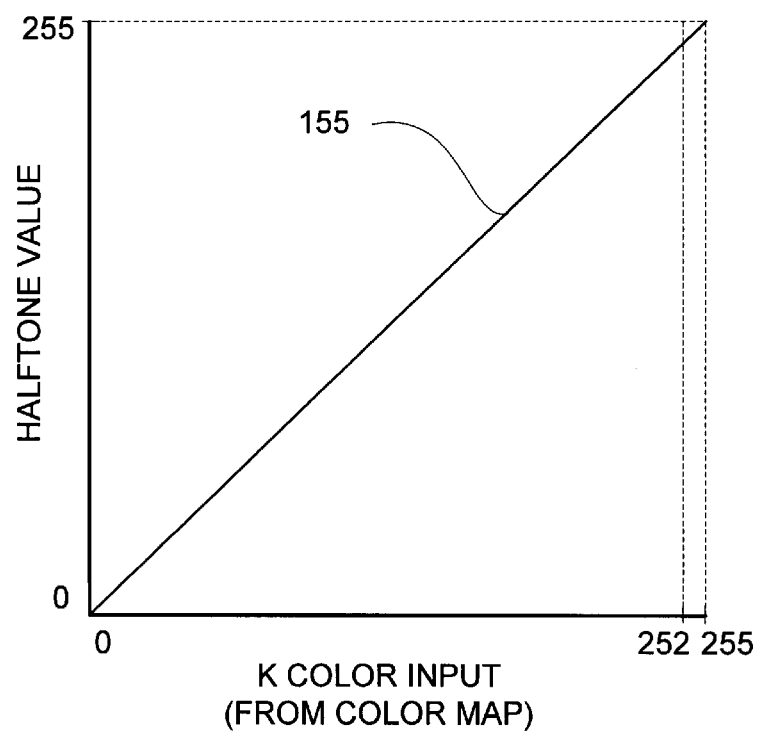
Figure 3C:
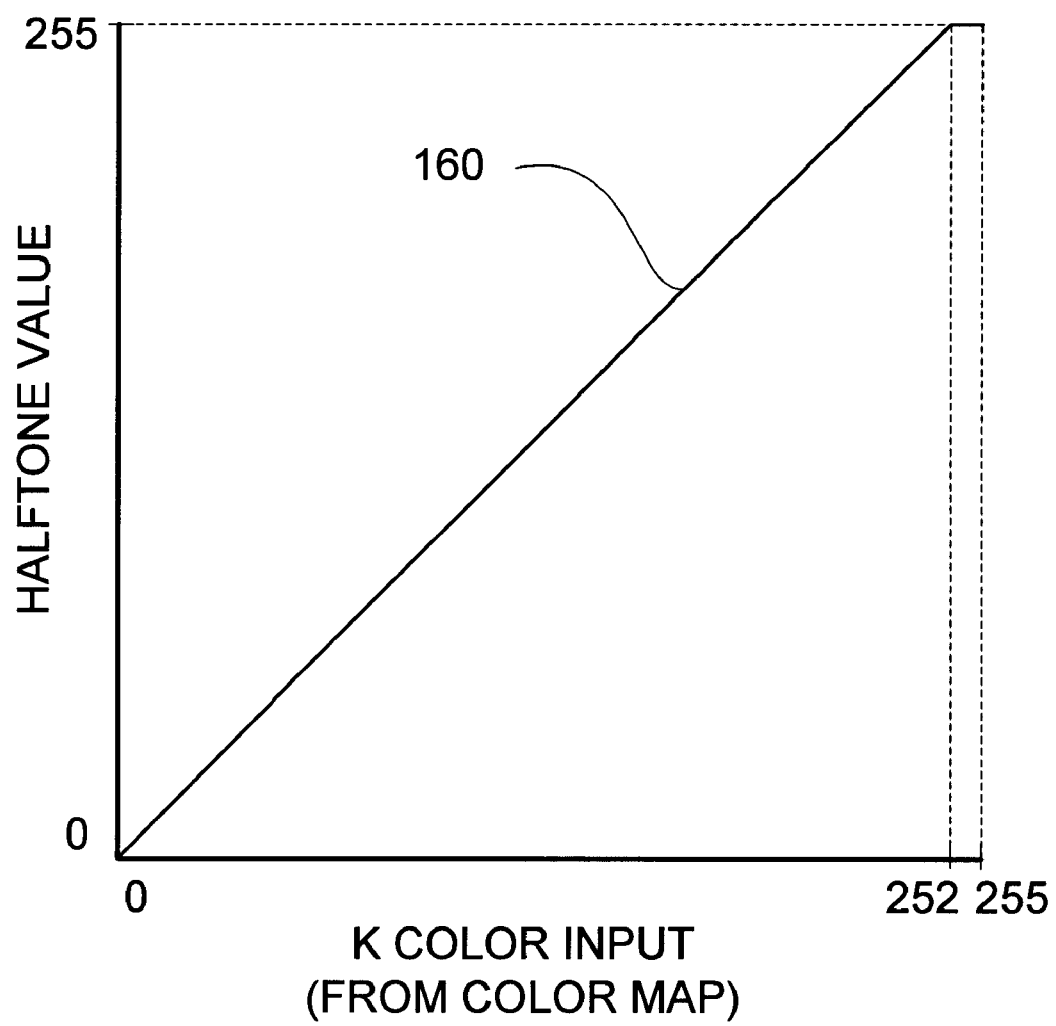

Specifically now, the x axis of FIGS. 3A–C represents the respective color plane value received from (or produced by) color map 105 of FIG. 2. The y axis represents the respective halftone screen value selected for any given x axis (color value) coordinate. Thus, in FIG. 3A, for a zero (white) C, M or Y color value along the x axis, the respective zero halftone value generated enables a selection of a halftone screen (halftone procedure 84 of FIG. 1) that does not render any pixels (i.e., no pixel is exposed so that no toner is developed). In contrast, for a 252 C, M or Y color value along the x axis, the respective halftone value of 255 is generated to enable a halftone screen selection that provides full pixel rendering (i.e., all pixels are exposed, or at least a stable selection of pixels are exposed, that visually represents a full development). Since 252 was designated (in this example) to be the maximum C, M or Y color value that could be generated from color map 105, except for at the black point, the maximum halftone value of 255 is selected. However, where the black point C, M or Y value of 255 (from color map 105) is input to ramp 150, a resultant halftone value of zero is generated thereby enabling a K-only black point to occur as will be seen in reference to FIGS. 3B and 3C.

In reference now to the K halftone ramps 155, 160 of FIG. 3B and FIG. 3C respectively, it is noted that, in contrast to the CMY color plane halftone ramp of FIG. 3A, where a black point K value of 255 (from color map 105) is input to ramp 155, a resultant full halftone value of 255 is generated. Thus, since the CMY halftone ramps produce a zero (white)

halftone value at the 255 color input, but the K halftone ramp produces a 255 (black) halftone value at the 255 color input, the result is a K-only black point. Importantly, these configurations allow the process black color values to be interpolated smoothly all the way to the black point without steep ramps or quantization, but what is actually printed at the black point is K-only for reduced image or interpolator artifacts.

Referring now to FIG. 4, and in summary of what has been described, a flow chart depicts a preferred method of the present invention. First, 210, all CMYK color values produced by color map 105 (FIG. 2) are generated such that any C, M or Y color values used in defining the black point are not generated except for at the black point. Next, the CMYK color values produced are passed to the appropriate halftone ramp 215. Specifically, 220, if any C, M or Y value that is used in defining the black point is equal to its respective C, M or Y black point value, then a halftone pattern is selected 225 to provide no rendering for that C, M or Y value. On the other hand, if the C, M or Y value is not equal to its respective C, M or Y black point value, then a halftone pattern is selected 230 that is representative of the respective C, M or Y value. In other words, 230, a lesser color value enables the selection of a lower density halftone pattern, and a higher color value enables the selection of a higher density halftone pattern as conventional in the art.

Next, 235, if the K value is equal to the K black point value, then a halftone pattern is selected 240 to provide full rendering for that K value. Otherwise, 245, if the K value is not equal to the K black point value, then a halftone pattern is selected 245 that is representative of the respective K value. By this method, or this color mapping and halftone ramping scheme, a K-only black point is achieved. Although the method depicted in FIG. 4 is shown as steps occurring sequentially, it will be understood that some steps may occur in parallel or in different order. For example, the order of receiving and processing the CMYK values through the respective halftone ramps may vary without departing from the principles of the present invention.

Finally, what has been described above are the preferred embodiments of an apparatus and method for reducing image artifacts by a unique implementation of color table(s) and halftone ramp(s) for enabling a K-only black point. While the present invention has been described by reference to specific embodiments, it will be apparent that other alternative embodiments and methods of implementation or modification may be employed without departing from the true spirit and scope of the invention.

What is claimed is:

1. A method of reducing image artifacts for an imaging device, comprising the steps of:
   (a) implementing a color map so that no resultant value for any given primary color equals a color value for that respective primary color that is used in defining a black point, except at the black point; and,
   (b) implementing a halftone ramp so that: (i) a halftone pattern is selected to provide no rendering for any primary color color value that is used in defining the black point, and (ii) a halftone pattern is selected to provide a full rendering for any non-primary color color value that is used in defining the black point.

2. The method of claim 1 wherein any primary color that is used in defining the black point is selected from a color plane group including cyan (C), magenta (M) or yellow (Y), and wherein any non-primary color is selected from the color plane group including black (K).

3. The method of claim 1 wherein the color map is, alternatively, an interleaved color map or a plurality of planar color maps.

4. The method of claim 1 wherein the halftone ramp includes, optionally, a single halftone ramp or a plurality of halftone ramps.

5. The method of claim 1 wherein the black point value for any primary color or non-primary color is defined by any value in a specified range of values from which the primary color or non-primary color color values are selected respectively.

6. The method of claim 1 further including implementing the color map so that no color value that is used in defining the black point for any given primary color is obtained as a result of an interpolation of the color map for that given primary color, except at the black point.

7. The method of claim 1 wherein the imaging device is selected from the group including a laser printer, ink jet printer, facsimile device or digital copier.

8. A method of reducing image artifacts when using a color map and a halftone ramp for color separation and halftone processing of data for an imaging device, the color map having entries that specify relative blending quantities for CMYK color values, the method comprising:
   (a) producing CMYK color values from the color map such that no C, M or Y color value that is used in defining a black point is produced, except at the black point;
   (b) generating halftone values from the halftone ramp, based on the CMYK color values produced from the color map, such that: (i) a first halftone value enables selection of a first halftone pattern for each C, M or Y color value that is used in defining the black point, and (ii) a second halftone value enables selection of a second halftone pattern for any K color value that is used in defining the black point; and,
   (c) enabling the first halftone pattern to provide no rendering and the second halftone pattern to provide a full rendering.

9. The method of claim 8 wherein the black point value for any C, M, Y or K color is defined by any value in a specified range of values from which the respective C, M, Y or K color values are selected.

10. The method of claim 8 further including producing CMYK color values as a result of an interpolation of the color map and such that no C, M or Y color value that is used in defining the black point is obtained, except at the black point.

11. The method of claim 8 wherein the imaging device is selected from the group including a laser printer, ink jet printer, facsimile device or digital copier.

12. An imaging device comprising:
   (a) a color map defined so that no resultant value for any given primary color equals a color value for that respective primary color that is used in defining a black point, except at the black point; and,
   (b) a halftone ramp defined so that: (i) a halftone pattern is selected to provide no rendering for any primary color color value that is used in defining the black point, and (ii) a halftone pattern is selected to provide a full rendering for any non-primary color color value that is used in defining the black point.

13. The imaging device of claim 12 wherein any primary color that is used in defining the black point is selected from the color plane group including cyan (C), magenta (M) and yellow (Y), and wherein any non-primary color is selected from the color plane group including black (K).

14. The imaging device of claim 12 wherein the color map is, alternatively, an interleaved color map or a plurality of planar color maps.

15. The imaging device of claim 12 wherein the halftone ramp includes, optionally, a single halftone ramp or a plurality of halftone ramps.

16. The imaging device of claim 12 wherein the black point value for any primary color or non-primary color is defined by any value in a specified range of values from which the primary color or non-primary color color values are selected respectively.

17. The imaging device of claim 12 further including implementing the color map so that no color value that is used in defining the black point for any given primary color is obtained as a result of an interpolation of the color map for that given primary color, except at the black point.

18. The imaging device of claim 12 wherein the imaging device is selected from the group including a laser printer, ink jet printer, facsimile device or digital copier.

19. A computer-readable medium having computer-executable instructions configured to:
   (a) enable a color man such that no resultant value for any given primary color equals a color value for that respective primary color that is used in defining a black point, except at the black point; and,
   (b) enable a halftone ramp such that: (i) a halftone pattern is selected to provide no rendering for any primary color color value that is used in defining the black point, and (ii) a halftone pattern is selected to provide a full rendering for any non-primary color color value that is used in defining the black point.

20. A computer-readable medium having computer-executable instructions configured to:
   (a) provide a color map such that no resultant C, M or Y color value that is used in defining a black point is produced by the color map, except at the black point;
   (b) provide halftone values from a halftone ramp based on the color values produced from the color map, such that: (i) a first halftone value enables selection of a first halftone pattern for each C, M or Y color value that is used in defining the black point, and (ii) a second halftone value enables selection of a second halftone pattern for any K color value that is used in defining the black point; and,
   (c) enable the first halftone pattern to provide no rendering and the second halftone pattern to provide a full rendering.

21. An imaging device comprising:
   (a) a print engine;
   (b) a processor coupled to the print engine;
   (c) a memory coupled to the processor;
   (d) a color map stored in the memory and defined such that no resultant value for any given primary color equals a color value for that respective primary color that is used in defining a black point, except at the black point; and,
   (e) a halftone ramp defined so that: (i) a halftone pattern is selected to provide no rendering for any primary color color value that is used in defining the black point, and (ii) a halftone pattern is selected to provide a full rendering for any non-primary color color value that is used in defining the black point.

* * * * *